US009635125B2

(12) United States Patent
Brooks et al.

(10) Patent No.: US 9,635,125 B2
(45) Date of Patent: Apr. 25, 2017

(54) ROLE-RELATIVE SOCIAL NETWORKING (71) Applicant: International Business Machines Corporation, Armonk, NY (US)

(72) Inventors: David A. Brooks, Arlington, MA (US); Miguel A. Estrada, Hollis, NH (US); Ethan L. Perry, Lexington, MA (US); Thomas Schaeck, Achern (DE); Michael C. Wanderski, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 408 days.

(21) Appl. No.: 14/166,147

(22) Filed: Jan. 28, 2014

(65) Prior Publication Data
US 2015/0213083 A1 Jul. 30, 2015

(51) Int. Cl.
G06F 17/30 (2006.01)
H04L 29/08 (2006.01)
G06Q 50/00 (2012.01)
H04L 29/06 (2006.01)
H04W 4/20 (2009.01)

(52) U.S. Cl.
CPC ........ H04L 67/30 (2013.01); G06F 17/30864 (2013.01); G06Q 50/01 (2013.01); H04L 63/105 (2013.01); H04L 67/306 (2013.01); H04W 4/206 (2013.01)

(58) Field of Classification Search
CPC ................................................. G06F 17/30864
USPC ........................................................ 707/758
See application file for complete search history.

(56) References Cited

U.S. PATENT DOCUMENTS

| 8,195,656 | B2 | 6/2012 | Grasset |
| 2010/0057772 | A1* | 3/2010 | Manolescu ............ G06Q 30/02 707/E17.055 |
| 2012/0036043 | A1 | 2/2012 | Koch et al. |
| 2012/0102420 | A1* | 4/2012 | Fukahori .............. G06Q 10/107 715/771 |
| 2012/0173626 | A1* | 7/2012 | Reis ................... G06Q 30/0241 709/204 |

(Continued)

OTHER PUBLICATIONS

United States Patent and Trademark Office, Office Action for U.S. Appl. No. 14/549,208, Jun. 10, 2016, pp. 1-15, Alexandria, VA, USA.

(Continued)

Primary Examiner — Joshua Bullock
(74) Attorney, Agent, or Firm — Lee Law, PLLC; Christopher B. Lee (57) ABSTRACT

A role-based social network follow request that identifies a specified user role to follow within a social network is received from a social network user. A social network role-based query, derived from the specified user role identified within the role-based social network follow request, is executed. In response to executing the social network role-based query, role-based information of social network users within the social network is retrieved. Another social network user that matches the specified user role is identified based upon the retrieved role-based information of the social network users. Role-based social network following of the matching other social network user is configured for the requesting social network user.

12 Claims, 6 Drawing Sheets

(56) References Cited

U.S. PATENT DOCUMENTS

| | | | | |
|---|---|---|---|---|
| 2012/0290950 A1* | 11/2012 | Rapaport | ................ | H04L 51/32 |
| | | | | 715/753 |
| 2012/0323909 A1 | 12/2012 | Behforooz et al. | | |
| 2014/0067964 A1* | 3/2014 | Grishaver | .............. | G06Q 50/01 |
| | | | | 709/206 |
| 2014/0129312 A1* | 5/2014 | Grishaver | .............. | G06Q 30/02 |
| | | | | 705/14.23 |
| 2014/0129317 A1* | 5/2014 | Grishaver | .......... | G06Q 30/0255 |
| | | | | 705/14.39 |
| 2014/0129345 A1* | 5/2014 | Grishaver | .............. | G06Q 50/01 |
| | | | | 705/14.66 |
| 2014/0208266 A1* | 7/2014 | Desai | .................... | G06F 3/0482 |
| | | | | 715/810 |

OTHER PUBLICATIONS

Joshua Bullock, Examiner, United States Patent and Trademark Office, Notice of Allowance for U.S. Appl. No. 14/549,208, Dec. 19, 2016, pp. 1-8, Alexandria, VA, USA.
Joshua Bullock, Examiner, United States Patent and Trademark Office, Office Action for U.S. Appl. No. 15/278,714, Jan. 17, 2017, pp. 1-18, Alexandria, VA, USA.

* cited by examiner

ROLE-RELATIVE SOCIAL NETWORKING

BACKGROUND

The present invention relates to social networking. More particularly, the present invention relates to role-relative social networking.

Social networks provide an online environment in which individual social network users may interact with other individual social network users. Social network users create connections within the online environment using their respective social network user names. As such, social networks allow the individual social network users to form direct person-to-person relationships within the online environment that are identified by their respective social network user names.

BRIEF SUMMARY

A method includes: receiving, via a processor from a social network user, a role-based social network follow request that identifies a specified user role to follow within a social network; executing a social network role-based query derived from the specified user role identified within the role-based social network follow request; retrieving, in response to executing the social network role-based query, role-based information of social network users within the social network; identifying another social network user that matches the specified user role based upon the retrieved role-based information of the social network users; and configuring, for the requesting social network user, role-based social network following of the matching other social network user.

A system includes a memory; and a processor programmed to: receive, from a social network user, a role-based social network follow request that identifies a specified user role to follow within a social network; execute a social network role-based query derived from the specified user role identified within the role-based social network follow request; retrieve, in response to executing the social network role-based query, role-based information of social network users within the social network; identify another social network user that matches the specified user role based upon the retrieved role-based information of the social network users; and configure, for the requesting social network user, role-based social network following of the matching other social network user within the memory.

A computer program product includes a computer readable storage medium having computer readable program code embodied therewith, where the computer readable program code when executed on a computer causes the computer to: receive, from a social network user, a role-based social network follow request that identifies a specified user role to follow within a social network; execute a social network role-based query derived from the specified user role identified within the role-based social network follow request; retrieve, in response to executing the social network role-based query, role-based information of social network users within the social network; identify another social network user that matches the specified user role based upon the retrieved role-based information of the social network users; and configure, for the requesting social network user, role-based social network following of the matching other social network user.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides role-relative social networking. Role-based social network follow requests that identify a specified user role to follow within a social network may be received and processed. The specified role may be an absolute role or a role specified relative to the requesting social network user. Role-based social network following by the requesting social network user of other social network users that match the specified role(s) may be configured, and postings by individual social network users may be identified by role (instead of by using an individual's identity or an individual's social network identity). The role-based postings may be provided to the requesting social network user. Because the role-based social network following is configured by role, instead of by individual identities, configuration of the role-based social network following may endure and persist beyond changes of individuals within configured and followed roles. As such, the present technology provides role-based following within social networks and provides an abstraction layer within social networks that allows flexible and improved specification of social network follow requests.

The present technology may implement/create a role-based social network graph that categorizes roles of social network users and relative roles of social network users within a social networking environment. The role-based social network graph derives up-to-date information that associates the social network users with a given role using specific characteristics. An expansive set of social network information queries may be performed using these specific relative characteristics to retrieve information relevant to an individual's current interests/role.

Social network roles that may be defined and queried include specific social network roles and relative social network roles. For example, specific social network roles may be defined and queried, such as product designer, chief executive officer (CEO), vice president of product development, and others specific/absolute roles as appropriate for a given implementation.

Similarly, relative social network roles (relative to a given social network user) may be defined and queried. For example, relative social network roles may include relative relationships, such as people I have met with in the last week, people that have contributed within the last month to social network communities that I own/manage, my manager(s), my employee(s), my assistant, persons that I assist, a social network community for my department, a social network community for my business unit, a social network community for my division, people that participate in a configured percentage of social network that I follow (e.g., participants in greater than fifty percent (50%) of social networks that I follow), people similar to a specified person (e.g., Jane Doe), and other relative social network roles as appropriate for a given implementation.

Using the present technology, role-based "following" may be performed, such that social network users may specify either a specific social network role or a relative social network role (relative to the user) to follow. The present technology performs the respective queries of social network information to identify social network postings by persons that satisfy the respective specific social network role or relative social network role (relative to the user requesting the social network query). As such, social network users do not have to specify individual identities to follow, and as personnel within an organization that occupy the respective roles or relative roles change over time, social network linkages do not have to be changed because they are based upon the role or relative role of the respective individuals.

A "natural language" query based upon the user's spoken language may be used for query generation to allow non-technical users to request persons within roles or relative roles to follow. As such, a user may state who to follow in the natural language based upon their relationship with the respective individual. The present technology may then parse the natural language information and derive social network information queries based upon available social network data. A set/list of one or more sample users that are determined to be included in the social network information query (at a given point in time) may be provided to the requesting user, and the user may be allowed to confirm accuracy of derived social network information queries. When a user reviews the set/list of users that are available to be followed by role, the user may be provided with a social network role label (an absolute/specific social network role label or a relative social network role label) for each individual that is available for role-based following. The social network role label may be created using the natural language string originally entered by the user and captured to form the social network information queries. A social network role-based follow list may be configured from the set/list of users that are available to be followed by role. The social network role-based follow list may be queried to identify postings to one or more social networks by the respective social network users that are followed according to their role. The user may be provided with a "view all" link to explore social network postings published to a given social network by the specified role-based users that are followed.

In addition, social network users may exclude role-based users from configured roles and may add role-based users to configured roles through manual override. Social network role-based interest profiles may be configured for individual users that include social network following interests of the requesting social network user. The interest profile information may be gathered using a social network discovery engine to derive other role-based individuals that may be of interest to (e.g., that match the social network following interests of) the respective user and to update/maintain the social network role-based follow list over time. Re-evaluation of individuals on the social network role-based follow list may be performed as appropriate for a given implementation as either the user for which role-based following is configured or other users that are followed by role change positions relative to one another or change positions within an organization.

It should be noted that conception of the present subject matter resulted from recognition of certain limitations associated with social network interaction systems. For example, it was observed that while social networks allow individuals to interact on an individual person-to-person level using social network user names, within a corporate organization or other structured environment, relationships between individuals may be more directly connected based upon the respective roles of the users within the structured environment rather than based upon the individuals themselves. Within this context, it was determined that a person within such an organization, such as a manager, may be interested in social network information posted by employees that report to the manager. However, if an employee moves to another project or department, the manager may no longer be interested in daily contributions to social network information related to the other project or department. It was additionally determined that "following" individuals using social media within these scenarios leads to increased costs with respect to network management, particularly in such dynamic situations where people often move to different roles within an organization. It was additionally determined that each person's interpretation of a role within an organization may vary, and a role may be interpreted as more of a relative role relationship in certain situations (e.g., my manager, people I called in the last week, etc.). Further, as a consequence of possible varied interpretations of roles, conventional "groups" that utilize individual social network identifiers are not an effective solution for role-based social networking in view of the range of available social data. The present subject matter improves social network interaction and social network management/maintenance by providing for role-relative social networking, as described above and in more detail below. As such, improved social network interaction based upon relative roles of social network users may be obtained through use of the present technology.

The role-relative social networking described herein may be performed in real time to allow prompt definition of role-based identifiers and communication within a social network using roles of other social network users relative to a given social network user. For purposes of the present description, real time shall include any time frame of sufficiently short duration as to provide reasonable response time for information processing acceptable to a user of the subject matter described. Additionally, the term "real time"

shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
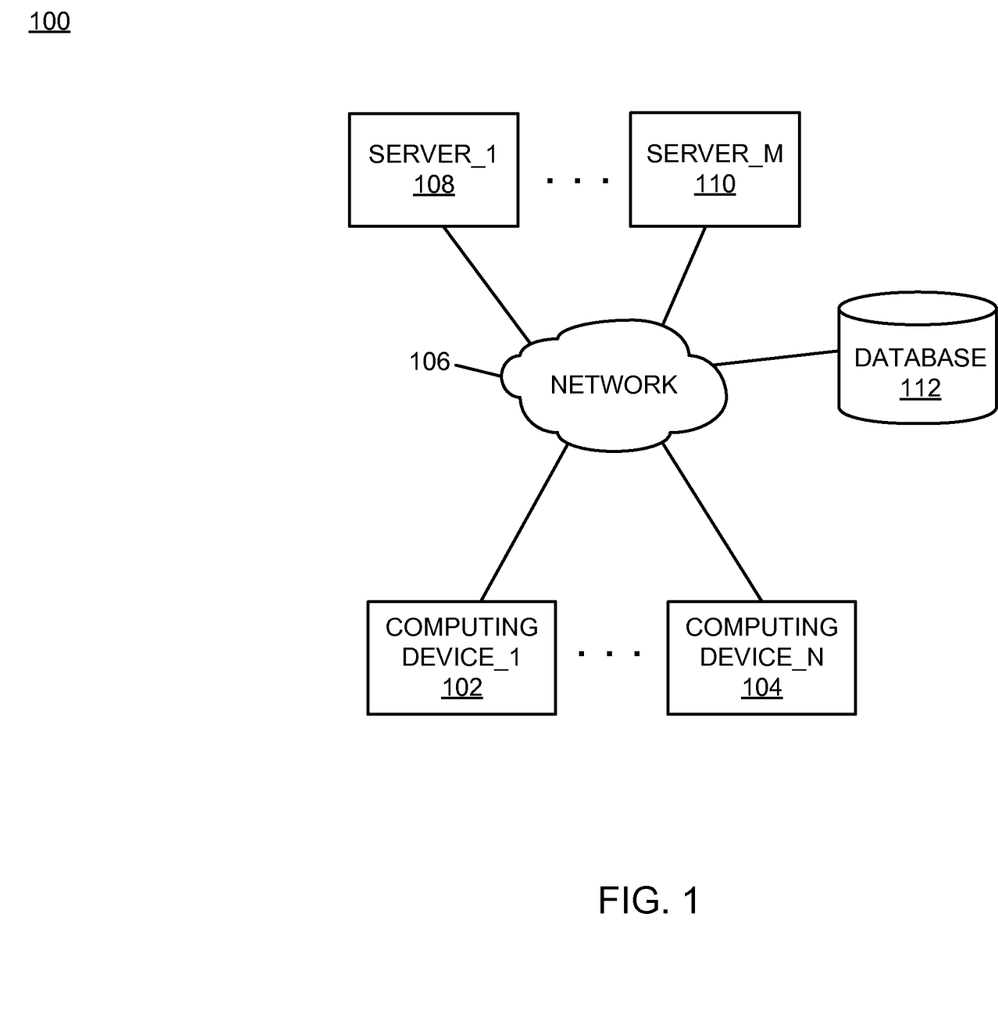
FIG. 1 is a block diagram of an example of an implementation of a system for role-relative social networking according to an embodiment of the present subject matter.

FIG. 1 is a block diagram of an example of an implementation of a system 100 for role-relative social networking. A computing device_1 102 through a computing device_N 104 communicate via a network 106 with several other devices. The other devices include a server_1 108 through a server_M 110. A database 112 generally represents storage within the system 100, and may be used to store social network information, such as social network user identifiers/accounts, role-based information (absolute and relative roles) for social network users, role-based follow lists, role-based interest profiles, and other information as appropriate for a given implementation.

As will be described in more detail below in association with FIG. 2 through FIG. 4C, the computing device_1 102 through the computing device_N 104 and the server_1 108 through the server_M 110 may each provide automated role-relative social networking. The automated role-relative social networking implemented by the respective device(s) is based upon identification of roles and relative roles of social network users, and configuration of information sharing (e.g., following) based upon roles and relative roles of social network users. As such, the present technology may be implemented at a user computing device or server device level. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, social networking server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The database 112 may include a relational database, an object database, or any other storage type of device. As such, the database 112 may be implemented as appropriate for a given implementation.

Figure 2:
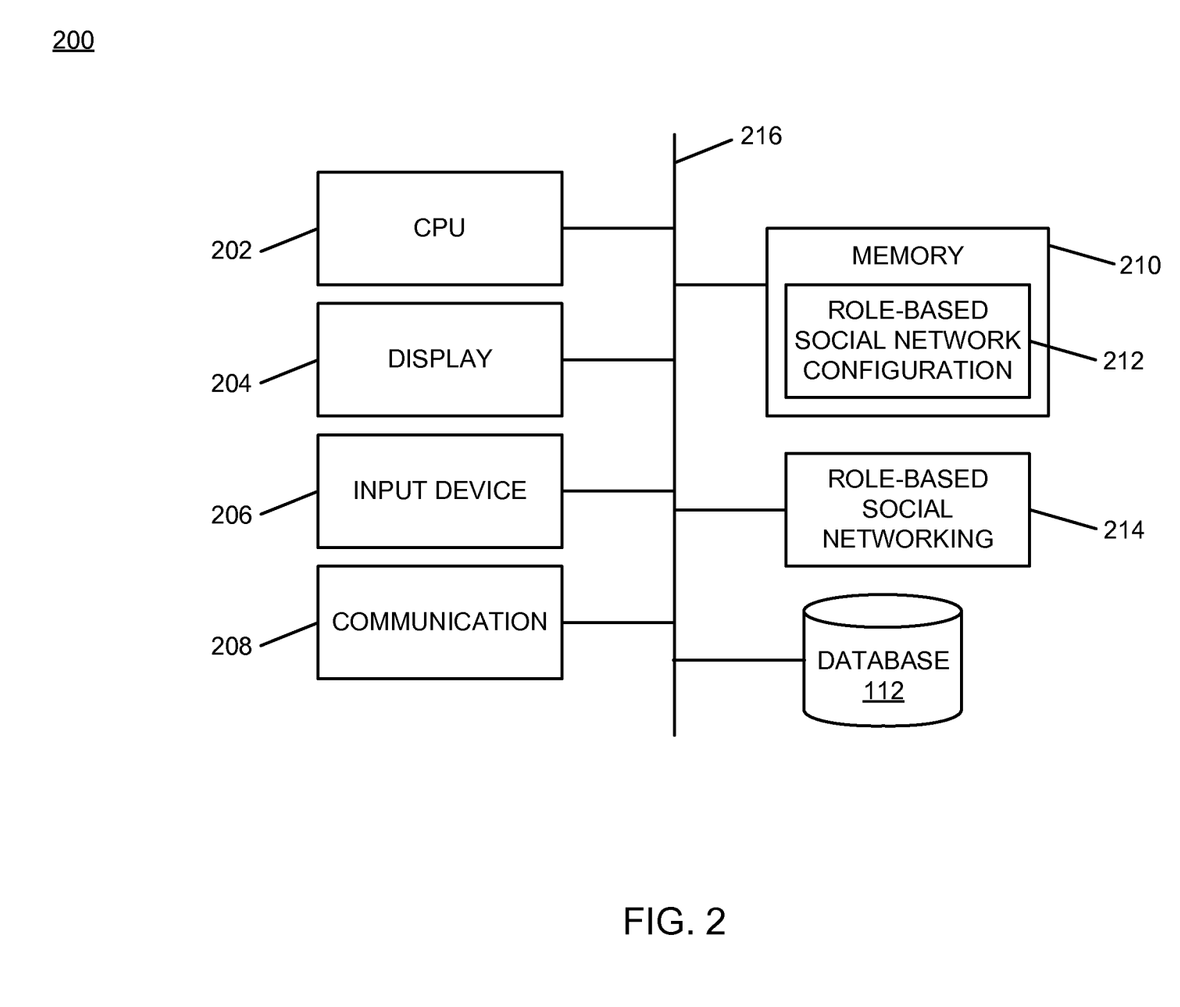
FIG. 2 is a block diagram of an example of an implementation of a core processing module capable of performing role-relative social networking according to an embodiment of the present subject matter.

FIG. 2 is a block diagram of an example of an implementation of a core processing module 200 capable of performing role-relative social networking. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of communications based upon absolute and relative roles between social network users within social networks in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a role-based social network configuration storage area 212 that stores role-based social network information as described above and in more detail below in association with core processing module 200. As will be described in more detail below, role-based social network information stored within the role-based social network configuration storage area 212 is used to implement and maintain role-based social network information sharing, such as following of social network users based upon absolute or relative roles within organizational social networks or other social network environments.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A role-based social networking module 214 is also illustrated. The role-based social networking module 214 operates as a social network discovery engine, and provides configuration and maintenance of role-based social network information sharing for the core processing module 200, as described above and in more detail below. The role-based social networking module 214 implements the automated role-relative social networking of the core processing module 200.

It should also be noted that the role-based social networking module 214 may form a portion of other circuitry described without departure from the scope of the present subject matter. Further, the role-based social networking module 214 may alternatively be implemented as an application stored within the memory 210. In such an implementation, the role-based social networking module 214 may include instructions executed by the CPU 202 for performing the functionality described herein. The CPU 202 may execute these instructions to provide the processing capabilities described above and in more detail below for the core processing module 200. The role-based social networking module 214 may form a portion of an interrupt service routine (ISR), a portion of an operating system, a portion of a browser application, or a portion of a separate application without departure from the scope of the present subject matter.

The database 112 is also shown associated with the core processing module 200 within FIG. 2 to show that the database 112 may be coupled to the core processing module 200 without requiring external connectivity, such as via the network 106.

The CPU 202, the display 204, the input device 206, the communication module 208, the memory 210, the role-based social networking module 214, and the database 112 are interconnected via an interconnection 216. The interconnection 216 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
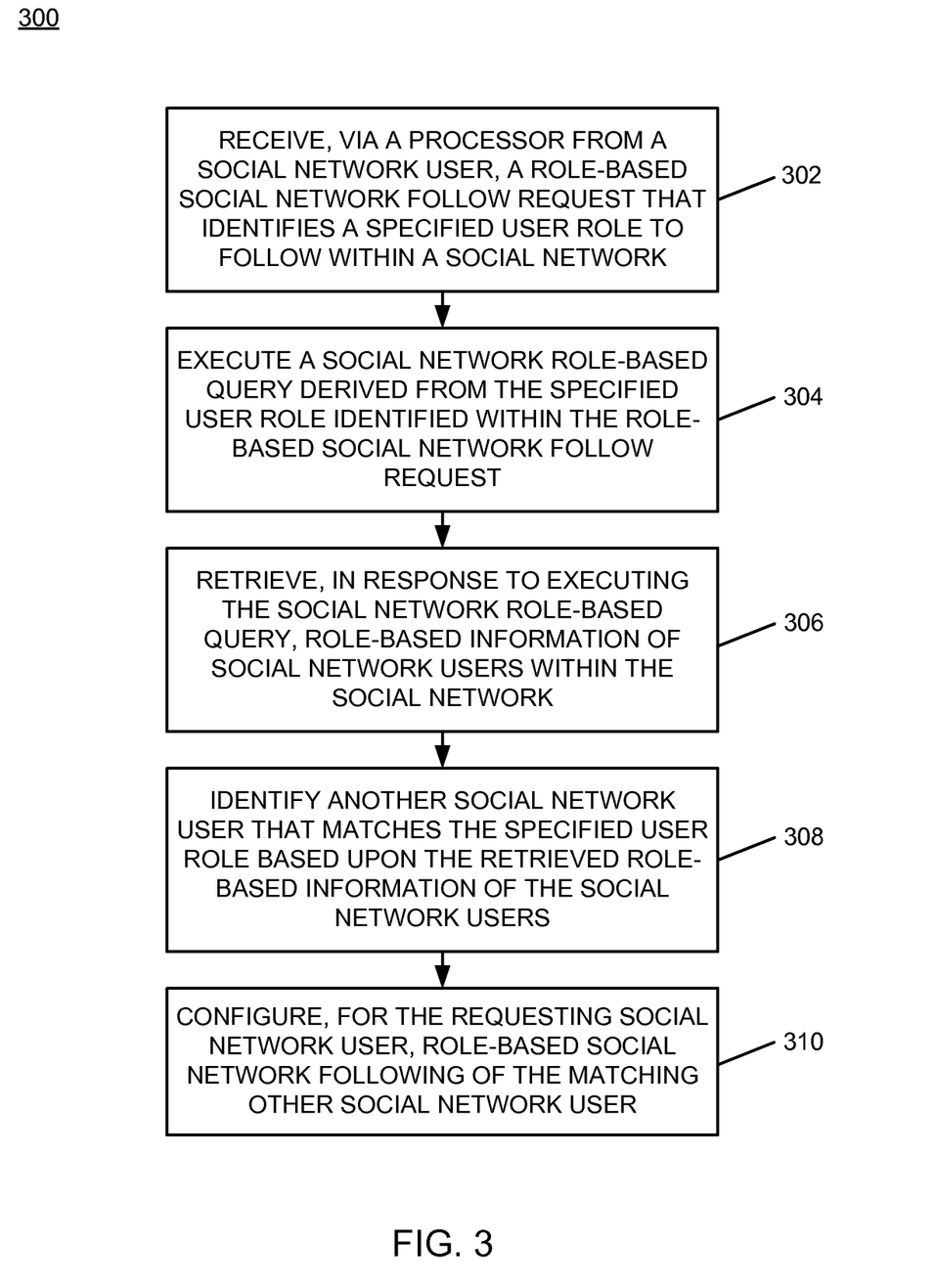
FIG. 3 is a flow chart of an example of an implementation of a process for role-relative social networking according to an embodiment of the present subject matter.
Figure 4A:
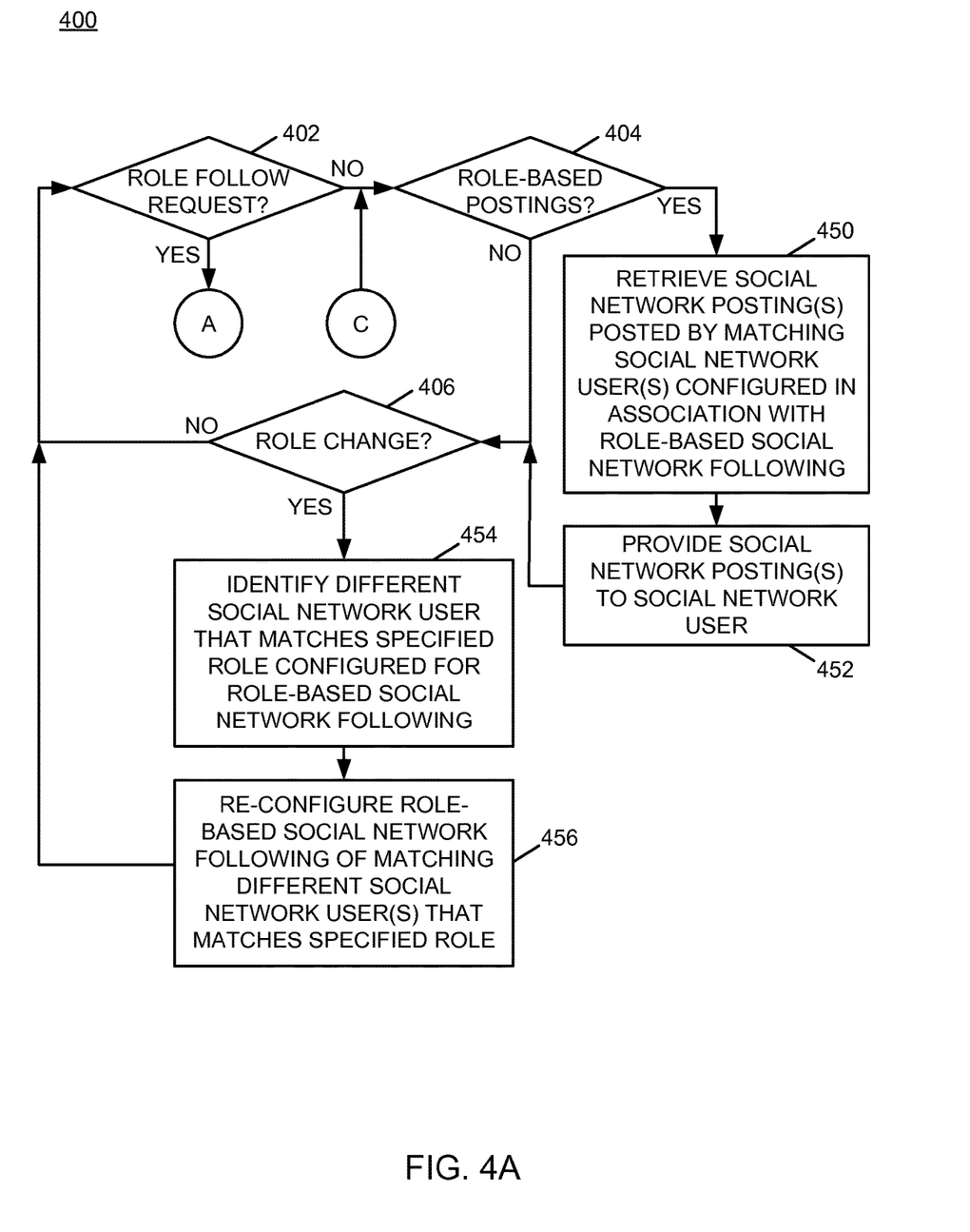
FIG. 4A is a flow chart of an example of an implementation of initial processing within a process for role-relative social networking using social network role-based follow lists according to an embodiment of the present subject matter.
Figure 4B:
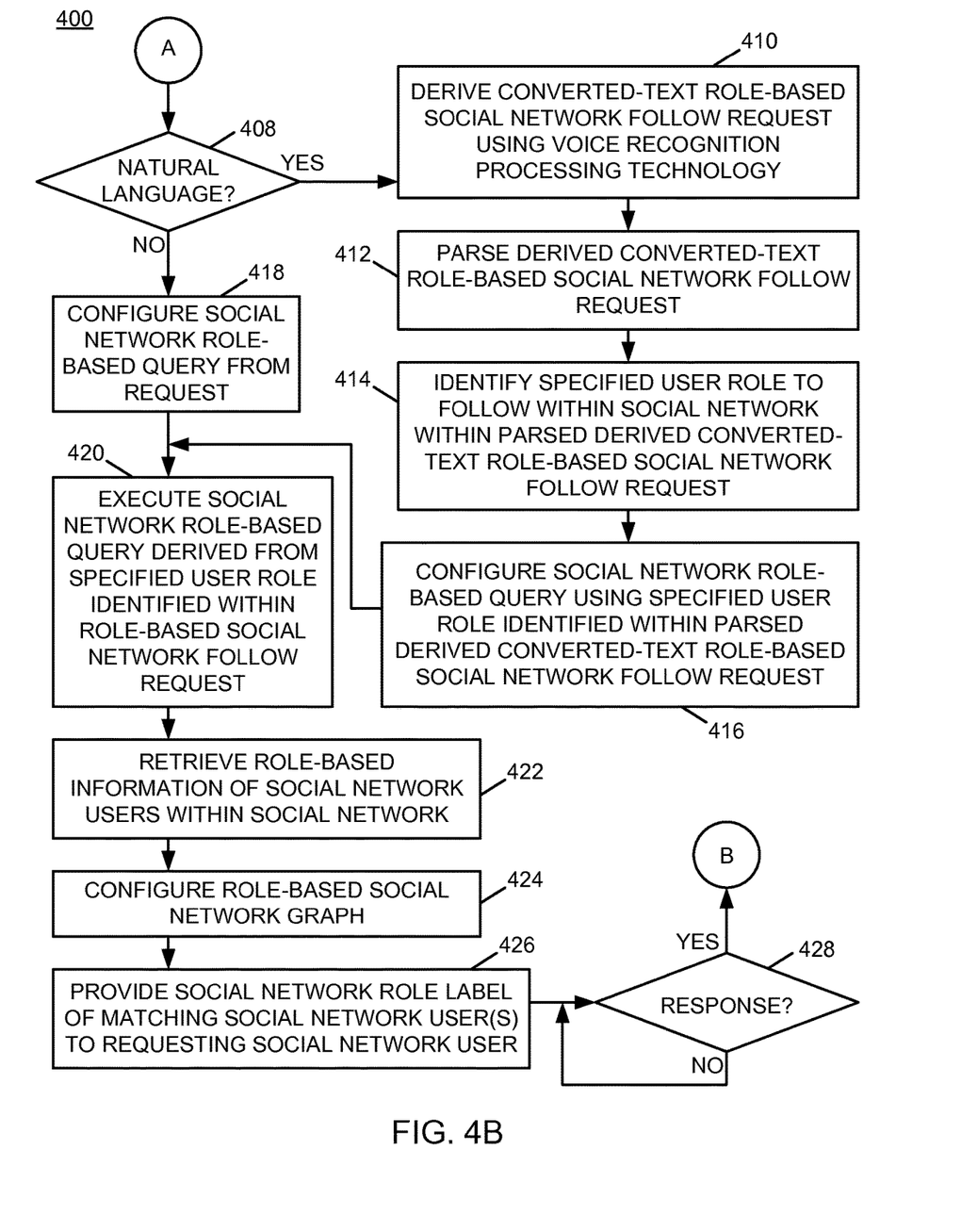
FIG. 4B is a flow chart of an example of an implementation of first additional processing within a process for role-relative social networking using social network role-based follow lists according to an embodiment of the present subject matter.
Figure 4C:
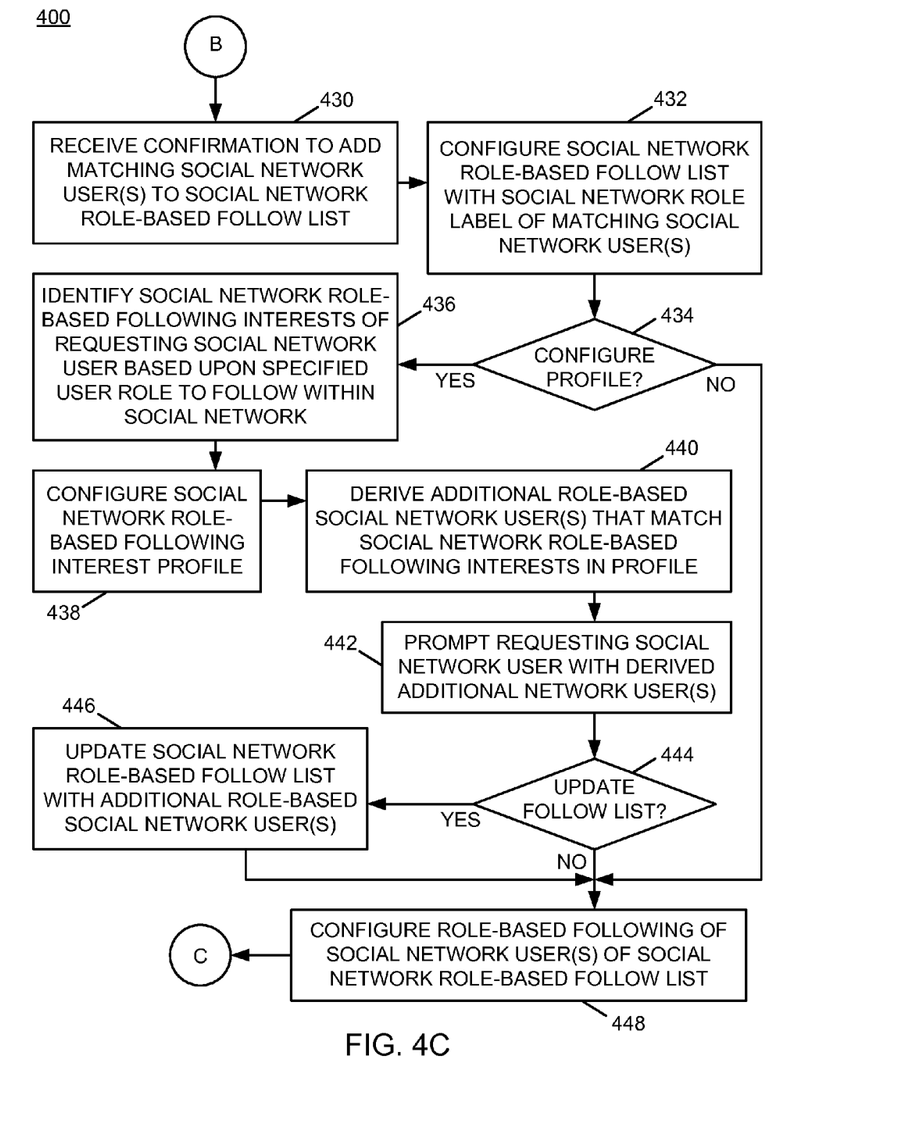
FIG. 4C is a flow chart of an example of an implementation of second additional processing within a process for role-relative social networking using social network role-based follow lists according to an embodiment of the present subject matter.

FIG. 3 through FIG. 4C described below represent example processes that may be executed by devices, such as the core processing module 200, to perform the automated role-relative social networking associated with the present subject matter. Many other variations on the example processes are possible and all are considered within the scope of the present subject matter. The example processes may be performed by modules, such as the role-based social networking module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for role-relative social networking. At block 302, the process 300 receives, via a processor from a social network user, a role-based social network follow request that identifies a specified user role to follow within a social network. At block 304, the process 300 executes a social network role-based query derived from the specified user role identified within the role-based social network follow request. At block 306, the process 300 retrieves, in response to executing the social network role-based query, role-based information of social network users within the social network. At block 308, the process 300 identifies another social network user that matches the specified user role based upon the retrieved role-based information of the social network users. At block 310, the process 300 configures, for the requesting social network user, role-based social network following of the matching other social network user.

FIGS. 4A-4C illustrate a flow chart of an example of an implementation of a process 400 for role-relative social networking using social network role-based follow lists. FIG. 4A illustrates initial processing within the process 400. At decision point 402, the process 400 begins higher-level iterative processing. Processing in response to affirmative determinations at the higher-level decision points will be deferred and described in more detail below. At decision point 402, the process 400 makes a determination as to whether a role-based social network follow request has been detected/received. As such, the process 400 may receive, from a social network user, a role-based social network follow request that identifies a specified user role to follow within a social network. A specified role-based social network follow request may be initiated by a social network user to request role-based following of one or more individual social network users by specification of an absolute role (e.g., product designer, chief executive officer (CEO), vice president of product development, and others specific/absolute roles as appropriate for a given implementation). Alternatively, the specified role-based follow request may be initiated by a social network user to request role-based following of one or more individual social network users by specification of a relative role (e.g., relative to the requesting user, such as my manager(s), my employees, my assistant, persons that I assist, and other relative roles as described above). As such, the requesting user may be associated with a requesting-user role within a social network, and the specified social network user role to follow within the social network may include a user role specified either absolutely or relatively to the requesting-user role of the requesting social network user.

In response to determining that a role-based follow request has not been detected/received, the process 400 makes a determination at decision point 404 as to whether one or more role-based postings have been detected. Detected role-based postings represent social network postings that are posted by matching social network user(s) that are configured in association with role-based social network following, as described above and in more detail below.

In response to determining that one or more role-based postings have not been detected, the process 400 makes a determination at decision point 406 as to whether a role change associated with any configured role-based following has been detected. A role change associated with a configured role-based following of either an absolute role or a relative role may include, for example, an individual changing jobs (e.g., absolute role change of a new person being appointed to a position of product designer, or a relative role change of a new person being appointed as "my manager").

In response to determining that a role change associated with any configured role-based following has not been detected, the process 400 returns to decision point 402 and iterates as described above. Processing associated with affirmative determinations at the respective higher-level decision points will now be described.

Returning to the description of decision point 402, in response to determining that a role-based social network follow request has been detected/received, the process 400 transitions to the processing shown and described in association with FIG. 4B.

FIG. 4B illustrates first additional processing associated with the process 400 for role-relative social networking using social network role-based follow lists. At decision point 408, the process 400 makes a determination as to whether the detected role-based follow request is a natural language role-based social network follow request (versus a text-based role-based social network follow request). In response to determining that the detected role-based follow request is a natural language role-based social network follow request, the process 400 derives a converted-text role-based social network follow request from the natural language role-based social network follow request using voice recognition processing technology at block 410. At block 412, the process 400 parses the derived converted-text role-based social network follow request. At block 414, the process 400 identifies the specified user role to follow within a social network (e.g., absolute or relative role) within the parsed derived converted-text role-based social network follow request. At block 416, the process 400 configures a social network role-based query using the specified user role identified within the parsed derived converted-text role-based social network follow request.

Returning to the description of decision point 408, in response to determining that the detected role-based follow request is not a natural language role-based social network follow request (e.g., is a text-based role-based social network follow request), the process 400 configures a social network role-based query using the specified user role identified within the text-based role-based social network follow request at block 418. In response to configuring the social network role-based query at either block 416 or at block 418, the process 400 executes the social network role-based query derived from the specified user role identified within the role-based social network follow request at block 420.

At block 422, the process 400 retrieves, in response to executing the social network role-based query, role-based information of social network users within the social network. At block 424, the process 400 configures a role-based social network graph that categorizes roles of social network users and relative roles of social network users within the social network. As such, the process 400 may identify other social network users that match the specified user role based upon the retrieved role-based information of the social network users and may create a social network graph based upon identified absolute and/or relative roles of social network users.

At block 426, the process 400 provides at least one social network role label of the matching other social network user(s) to the requesting social network user. The process 400 may also or alternatively provide the configured role-based social network graph to the requesting social network user that includes the respective social network role label(s) of one or more identified matching other social network users. As such, the requesting user may review and confirm the identified matching other social network users to follow based upon their identified roles (absolute or relative to the requesting user).

At decision point 428, the process 400 makes a determination as to whether a response has been received/detected from the requesting social network user. In response to determining that a response has been received/detected from the requesting social network user, the process 400 transitions to the processing shown and described in association with FIG. 4C.

FIG. 4C illustrates second additional processing associated with the process 400 for role-relative social networking using social network role-based follow lists. At block 430, the process 400 receives a confirmation from the requesting social network user to add the matching other social network user(s) to a social network role-based follow list of the requesting social network user. At block 432, the process 400 configures the social network role-based follow list of the requesting social network user with the social network role label of the matching other social network user(s).

At decision point 434, the process 400 prompts the requesting social network user to determine whether the user requests configuration of a social network role-based following interest profile. As described above and in more detail below, a social network role-based following interest profile may be utilized to identify other social network users by role that may be provided to the requesting social network user to follow by role within one or more social networks. Description of a negative determination at decision point 434 will be deferred and described in more detail below.

In response to determining that the requesting social network user has requested configuration of a social network role-based following interest profile at decision point 434, the process 400 identifies social network role-based following interests of the requesting social network user based upon the specified user role to follow within a social network at block 436. The social network following interests may include, for example, a requesting user that specifies a role of product developer identifying a social network role-based following interest of "product development." Many other examples of social network role-based following interests are possible and all are considered within the scope of the present subject matter.

At block 438, the process 400 configures a social network role-based following interest profile including the identified social network following interests of the requesting social network user. At block 440, the process 400 derives additional role-based social network users that match the social network role-based following interests of the requesting social network user configured within the social network role-based interest profile.

At block 442, the process 400 prompts the requesting social network user with any derived additional role-based social network users that match the social network role-based following interests to allow the user to confirm the addition of any derived additional role-based social network users to the social network role-based follow list configured for the requesting social network user. At decision point 444, the process 400 makes a determination as to whether the user has requested an update of the social network role-based follow list configured for the requesting social network user by addition of any derived additional role-based social network users to the requesting user's social network role-based follow list. In response to determining that the requesting social network user has confirmed the social network role-based follow list update to add at least one derived additional role-based social network users that match the social network role-based following interests to follow, the process 400 updates the social network role-based follow list configured for the requesting social network user with the derived additional role-based social network users that match the social network following interests of the requesting social network user configured within the social network role-based interest profile at block 446.

In response to any of updating the social network role-based follow list at block 446, in response to determining at decision point 444 that the user has not confirmed an update to add at least one derived additional role-based social network users to follow, or in response to a determination at decision point 434 that the requesting social network user has not requested configuration of a social network role-based following interest profile, the process 400 configures role-based social network following of the matching other social network user(s) by the requesting social network user at block 448. Again, as described above, the role-based following may be based upon absolute roles or relative roles specified in relation to a requesting-user role of the requesting social network user. The process 400 returns to the processing described in association with FIG. 4A at decision point 404 and iterates as described above.

Returning to the description of decision point 404, with at least one social network role-based following configured, in response to determining that one or more role-based postings have been detected, the process 400 retrieves at least one social network posting posted by the matching social network user configured in association with the role-based social network following at block 450. At block 452, the process 400 provides the retrieved at least one social network posting posted by the matching social network user configured in association with the role-based social network following to the social network user from which the role-based social network follow request was received. As such, the role-based following configured for the requesting social network user may result in postings, that are identified based upon a role (absolute or relative to the requesting social network user), being provided to the requesting social network user. The process 400 returns to decision point 406 and iterates as described above.

Returning to the description of decision point 406, as described above, individual social network users associated with roles may change over time, but the configuration of the role-based social network following may endure and persist beyond changes of individuals within configured social network roles. As such, in response to determining that a role change (again, either absolute or relative role) associated with any configured role-based following has been detected at decision point 406, the process 400 identifies a different social network user that matches the specified user role configured in association with role-based social network following at block 454. At block 456, the process 400 re-configures the role-based social network following of the matching different social network user(s) that matches the specified user role by the requesting social network user. As such, the role-based network following may persist beyond changes of individuals within identified absolute and/or relative roles (e.g., product developer, vice president, my manager, my employee, etc.).

Accordingly, the process 400 receives and processes role-based social network follow request, and identifies social network users that match specified user role(s) based upon retrieved role-based information of the social network users. The specified roles may be absolute roles or roles specified relatively to the requesting-user role of the requesting social network user. The process 400 may configure social network role-based follow lists and social network role-based following interest profiles for the requesting social network user. Social network postings by individual social network users may be identified by role (instead of by the individual's identity or the individual's social network identity), and provided to the requesting social network user. Individual users may change roles over time and the configured role-based social network following may persist.

As described above in association with FIG. 1 through FIG. 4C, the example systems and processes provide role-relative social networking. Many other variations and additional activities associated with role-relative social networking are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
a memory; and
a processor programmed to:
receive, from a social network user, a role-based social network follow request that identifies a specified user role to follow within a social network;
execute a social network role-based query derived from the specified user role identified within the role-based social network follow request;
retrieve, in response to executing the social network role-based query, role-based information of social network users within the social network;
identify another social network user that matches the specified user role based upon the retrieved role-based information of the social network users;
configure, for the requesting social network user, role-based social network following of the matching other social network user within the memory;
determine a change of role of the matching other social network user configured in association with the role-based social network following;
identify a different social network user that matches the specified user role configured in association with role-based social network following; and
re-configure, for the requesting social network user, the role-based social network following within the memory to follow the matching different social network user that matches the specified user role.

2. The system of claim 1, where:
the requesting social network user is associated with a requesting-user role within the social network;
the specified user role to follow within the social network comprises a user role specified relatively to the requesting-user role of the requesting social network user; and
in being programmed to configure, for the requesting social network user, the role-based social network following of the matching other social network user within the memory, the processor is programmed to configure, for the requesting social network user, relative role-based social network following of the matching other social network user within the memory.

3. The system of claim 1, where the processor is further programmed to:
retrieve at least one social network posting posted by the matching other social network user configured in association with the role-based social network following; and
provide the retrieved at least one social network posting posted by the matching other social network user configured in association with the role-based social network following to the social network user from which the role-based social network follow request was received.

4. The system of claim 1, where the processor is further programmed to:
configure, in response to retrieving the role-based information of social network users within the social network, a role-based social network graph that categorizes roles of social network users and relative roles of social network users within the social network using social network role labels within the memory;
provide a social network role label of the matching other social network user to the requesting social network user;
receive a confirmation from the requesting social network user to add the matching other social network user to a social network role-based follow list of the requesting social network user; and
configure the social network role-based follow list of the requesting social network user with the social network role label of the matching other social network user within the memory.

5. The system of claim 1, where:
in being programmed to configure, for the requesting social network user, the role-based social network following of the matching other social network user within the memory, the processor is programmed to:
identify social network role-based following interests of the requesting social network user based upon the specified user role to follow within the social network;
configure a social network role-based following interest profile comprising the social network following interests of the requesting social network user within the memory; and
derive additional role-based social network users that match the social network role-based following interests of the requesting social network user configured within the social network role-based following interest profile.

6. The system of claim 5, where the processor is further programmed to update a social network role-based follow list configured for the requesting social network user using the derived additional role-based social network users that match the social network following interests of the requesting social network user configured within the social network role-based following interest profile.

7. A computer program product, comprising:
a computer readable storage medium having computer readable program code embodied therewith, where the computer readable program code when executed on a computer causes the computer to:
receive, from a social network user, a role-based social network follow request that identifies a specified user role to follow within a social network;
execute a social network role-based query derived from the specified user role identified within the role-based social network follow request;
retrieve, in response to executing the social network role-based query, role-based information of social network users within the social network;
identify another social network user that matches the specified user role based upon the retrieved role-based information of the social network users;
configure, for the requesting social network user, role-based social network following of the matching other social network user;
determine a change of role of the matching other social network user configured in association with the role-based social network following;
identify a different social network user that matches the specified user role configured in association with role-based social network following; and re-configure, for the requesting social network user, the role-based social network following to follow the matching different social network user that matches the specified user role.

8. The computer program product of claim 7, where:
the requesting social network user is associated with a requesting-user role within the social network;
the specified user role to follow within the social network comprises a user role specified relatively to the requesting-user role of the requesting social network user; and
in causing the computer to configure, for the requesting social network user, the role-based social network following of the matching other social network user, the computer readable program code when executed on the computer causes the computer to configure, for the requesting social network user, relative role-based social network following of the matching other social network user.

9. The computer program product of claim 7, where the computer readable program code when executed on the computer further causes the computer to:
retrieve at least one social network posting posted by the matching other social network user configured in association with the role-based social network following; and
provide the retrieved at least one social network posting posted by the matching other social network user configured in association with the role-based social network following to the social network user from which the role-based social network follow request was received.

10. The computer program product of claim 7, where the computer readable program code when executed on the computer further causes the computer to:
configure, in response to retrieving the role-based information of social network users within the social network, a role-based social network graph that categorizes roles of social network users and relative roles of social network users within the social network using social network role labels;
provide a social network role label of the matching other social network user to the requesting social network user;
receive a confirmation from the requesting social network user to add the matching other social network user to a social network role-based follow list of the requesting social network user; and
configure the social network role-based follow list of the requesting social network user with the social network role label of the matching other social network user.

11. The computer program product of claim 7, where, in causing the computer to configure, for the requesting social network user, the role-based social network following of the matching other social network user, the computer readable program code when executed on the computer causes the computer to:
identify social network role-based following interests of the requesting social network user based upon the specified user role to follow within the social network;
configure a social network role-based following interest profile comprising the social network following interests of the requesting social network user; and
derive additional role-based social network users that match the social network role-based following interests of the requesting social network user configured within the social network role-based following interest profile.

12. The computer program product of claim 11, where the computer readable program code when executed on the computer further causes the computer to update a social network role-based follow list configured for the requesting social network user using the derived additional role-based social network users that match the social network following interests of the requesting social network user configured within the social network role-based following interest profile.

* * * * *